(12) United States Patent
Grigore

(10) Patent No.: US 12,206,923 B2
(45) Date of Patent: *Jan. 21, 2025

(54) SYSTEMS AND METHODS FOR CONTENT DISTRIBUTION

(71) Applicant: Adeia Guides Inc., San Jose, CA (US)

(72) Inventor: George Grigore, Iasi (RO)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,095

(22) Filed: Sep. 28, 2023

(65) Prior Publication Data
US 2024/0022776 A1    Jan. 18, 2024

Related U.S. Application Data

(63) Continuation of application No. 17/127,621, filed on Dec. 18, 2020, now Pat. No. 11,812,079, which is a
(Continued)

(51) Int. Cl.
*H04N 21/258* (2011.01)
*G06F 3/147* (2006.01)
(Continued)

(52) U.S. Cl.
CPC ....... *H04N 21/25841* (2013.01); *G06F 3/147* (2013.01); *H04N 21/414* (2013.01); *H04N 21/41407* (2013.01); *H04N 21/4316* (2013.01); *H04N 21/436* (2013.01); *H04N 21/4532* (2013.01); *H04N 21/462* (2013.01); *H04N 21/4627* (2013.01); *H04N 21/472* (2013.01);
(Continued)

(58) Field of Classification Search
CPC ........... H04N 21/25841; H04N 21/414; H04N 21/41407; H04N 21/4316; H04N 21/436; H04N 21/4532; H04N 21/462; H04N 21/4627; H04N 21/472; H04N 21/4788; H04N 21/6125; H04N 21/6405; H04N 21/6408
USPC .................................................... 725/74, 135
See application file for complete search history.

(56) References Cited

U.S. PATENT DOCUMENTS 7,970,894 B1    6/2011    Patwardhan
11,805,289 B2    10/2023    Grigore
(Continued)

OTHER PUBLICATIONS

International Search Report and Written Opinion in PCT/US2018/062047 dated Nov. 20, 2018.
U.S. Appl. No. 18/372,243, filed Sep. 25, 2023, George Grigore.

*Primary Examiner* — Dominic D Saltarelli
(74) *Attorney, Agent, or Firm* — Haley Guiliano LLP

(57) ABSTRACT

Systems and methods are disclosed herein for distributing content over a local area network (LAN) between a first device within the LAN and a second device within the LAN. A first device multicasts a LAN-specific content beacon over the LAN. The LAN-specific content beacon includes an identifier uniquely identifying the first device. A second device sends a response to the LAN-specific content beacon requesting secondary content to be integrated into a display of the second device. The first device generates the secondary content based on profile information associated with the second device and unicasts the secondary content to the second device for integration into primary content being generated for display at the second device.

20 Claims, 8 Drawing Sheets

Related U.S. Application Data continuation of application No. 17/253,808, filed as application No. PCT/US2018/062047 on Nov. 20, 2018, now Pat. No. 11,805,289.

(51) Int. Cl.

| | |
|---|---|
| *H04N 21/414* | (2011.01) |
| *H04N 21/431* | (2011.01) |
| *H04N 21/436* | (2011.01) |
| *H04N 21/45* | (2011.01) |
| *H04N 21/462* | (2011.01) |
| *H04N 21/4627* | (2011.01) |
| *H04N 21/472* | (2011.01) |
| *H04N 21/478* | (2011.01) |
| *H04N 21/4788* | (2011.01) |
| *H04N 21/61* | (2011.01) |
| *H04N 21/64* | (2011.01) |
| *H04N 21/6405* | (2011.01) |
| *H04N 21/6408* | (2011.01) |

(52) U.S. Cl.
CPC ..... *H04N 21/4788* (2013.01); *H04N 21/6125* (2013.01); *H04N 21/6405* (2013.01); *H04N 21/6408* (2013.01)

(56) References Cited

U.S. PATENT DOCUMENTS

| | | | |
|---|---|---|---|
| 11,812,079 | B2 | 11/2023 | Grigore |
| 2005/0138663 | A1 | 6/2005 | Throckmorton |
| 2006/0159109 | A1 | 7/2006 | Lamkin et al. |
| 2006/0161635 | A1 | 7/2006 | Lamkin |
| 2007/0033531 | A1 | 2/2007 | Marsh |
| 2009/0011709 | A1* | 1/2009 | Akasaka ............... H04W 24/00 |
| | | | 455/41.3 |
| 2012/0149309 | A1* | 6/2012 | Hubner ................. H04W 4/023 |
| | | | 455/67.11 |
| 2015/0172757 | A1 | 6/2015 | Kafle |
| 2016/0205428 | A1* | 7/2016 | McDonough ...... H04N 21/4524 |
| | | | 725/31 |
| 2016/0353253 | A1 | 12/2016 | Cherian |
| 2017/0180814 | A1 | 6/2017 | Stathacopoulos et al. |
| 2017/0289639 | A1* | 10/2017 | Reisner ................... H04L 67/06 |
| 2017/0359428 | A1 | 12/2017 | Lebeau |
| 2018/0167867 | A1 | 6/2018 | Speight |
| 2019/0028781 | A1* | 1/2019 | Bigio ............... H04N 21/43615 |
| 2021/0105522 | A1 | 4/2021 | Grigore |
| 2021/0274239 | A1 | 9/2021 | Grigore |
| 2024/0015345 | A1 | 1/2024 | Grigore |

\* cited by examiner

SYSTEMS AND METHODS FOR CONTENT DISTRIBUTION

CROSS-REFERENCE TO RELATED APPLICATIONS

This application is a continuation of U.S. patent application Ser. No. 17/127,621, filed Dec. 18, 2020, which is a continuation of U.S. patent application Ser. No. 17/253,808, filed Dec. 18, 2020, which is a national stage application under 35 U.S.C. § 371 of International Application PCT/US2018/062047, filed Nov. 20, 2018, all of which are hereby incorporated by reference herein in their entireties.

BACKGROUND

This disclosure is generally directed to sharing media over a local area network. In particular, methods and systems are provided for sharing content between devices within the local area network using beacons.

SUMMARY

A wide range of interactive devices have been developed to provide content to users. These interactive devices include, for example, mobile devices, tablets, computers, smart television systems and the like. It is often desirable to embed content specific to the user with the primary content being presented to the user via the interactive devices in a non-obtrusive manner. For example, when a user is playing a video game on a smart television system, they may prefer a particular musical playlist to be incorporated within the video game to improve the gameplay experience. However, the video game application and the smart television may not have access to content such as the user's preferred musical playlist. Conventionally, these interactive devices present only the primary content to the user without including any secondary content specific to the user, thus resulting in a subpar experience for the user.

Recently, internet-enabled devices such as smart TVs, tablets, mobile devices, and the like often access profiles that are tied to the users to provide content such as advertisements specifically targeted to the users to be embedded with the primary content. These systems rely on having access to the user profiles over a wide area network (WAN) such as the Internet. It is desirable, however, to provide such content specifically targeted to the users to these interactive devices even when the devices are not connected to a WAN. Additionally, conventional systems for providing such targeted content do not have access to content owned by the users (e.g., user's preferred musical playlist) unless the content owned by the users is made available via WAN by the users. Users, however, may not wish to have their personal content be accessible by third-party applications via WAN due to privacy and security concerns.

Additionally, some systems may have an outdated or incomplete user profile, or not have any data at all about the user. Such systems can therefore search for targeted content within the LAN. Systems and methods are provided herein to collaboratively support content discovery and consumption within a LAN, without need for a target system to have access to the user profiles.

Accordingly, to overcome these problems, systems and methods are provided herein for distributing secondary content over a local area network (LAN) between a first device within the LAN and a second device within the LAN. Systems and methods described herein use a content beaconing system to authenticate the devices within the LAN and to share secondary content. The first device multicasts a LAN-specific content beacon over the LAN. The LAN-specific content beacon includes an identifier uniquely identifying the first device. The second device prepares a response to the LAN-specific content beacon when the second device wants to access secondary content available on the first device. The response to the content beacon includes identification information uniquely identifying the second device and a request for the secondary content.

When the second device sends a response to the LAN-specific content beacon, the first device generates secondary content based on profile information corresponding to the second device. The secondary content may be generated based on retrieving data related to content previously generated for display on the second device. Additionally, the first device may identify content available to the first device and having access rights that match the second device. The first device may also identify content having metadata that matches the primary content being generated for display at the second device. The first device subsequently unicasts the secondary content over the LAN to the second device to be integrated into the primary content being generated for display at the second device.

Additionally, a third device within the LAN may also send a response to the LAN-specific content beacon to the first device. The first device generates a second secondary content based on profile information corresponding to the third device and unicasts the second secondary content over the LAN to the third device for integration into a second primary content being generated for display at the third device.

In one implementation, the first device within the LAN multicasts a LAN-specific content beacon over the LAN. The multicast LAN-specific content beacon includes a request for secondary content to be integrated with primary content being generated for display at the first device. The first device receives a response to the LAN-specific content beacon from a second device within the LAN requesting identification information of the first device. The response to the LAN-specific content beacon includes an identifier uniquely identifying the second device. In response to receiving the response to the content beacon from the second device within the LAN, the first device unicasts identification information of the first device to the second device over the LAN. Optionally, the first device also unicasts information related to an application in operation at the first device application within which the primary content is displayed at the first device.

In response to unicasting the identification information of the first device to the second device over the LAN, the first device receives a unicast stream from the second device over the LAN at the first device. The unicast stream includes the secondary content generated based on identification information of the first device. The secondary content may be generated based on retrieving data related to content previously generated for display on the first device. Additionally, the secondary content may be generated based on content to which the first device has access rights. The first device, upon receiving the secondary content from the second device, generates a display combining the received secondary content and the primary content, and outputs the display with the first device.

In this way, the first device (e.g., a smart television) receives secondary content (e.g., a personal musical playlist) to be integrated into primary content being generated for display at the first device (e.g., a video game) even when the first device is not connected to a WAN. Moreover, because the systems and methods described herein use LAN-specific content beacons to exchange identification information, the user is presented only with content verified to be associated with them and is not presented with generic content. This improvement is particularly relevant when inserting advertisements as the secondary content to maximize the effectiveness of the advertisement.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure are described herein for distribution of secondary content over a local area network (LAN) from a first user equipment device within the LAN to a second user equipment device within the LAN using content beacons. For example, a user watching a movie on a mobile phone may wish to receive a score update from a soccer match on the mobile phone without interrupting the movie-watching experience. A tablet having access to the score update exchanges identification information with the mobile phone associated with the user and provides secondary content to the mobile phone in the form of a score update to be integrated with the movie being generated for display at the mobile phone. For example, a billboard within the movie may display the score update from the soccer match received from the tablet.

Figure 1:
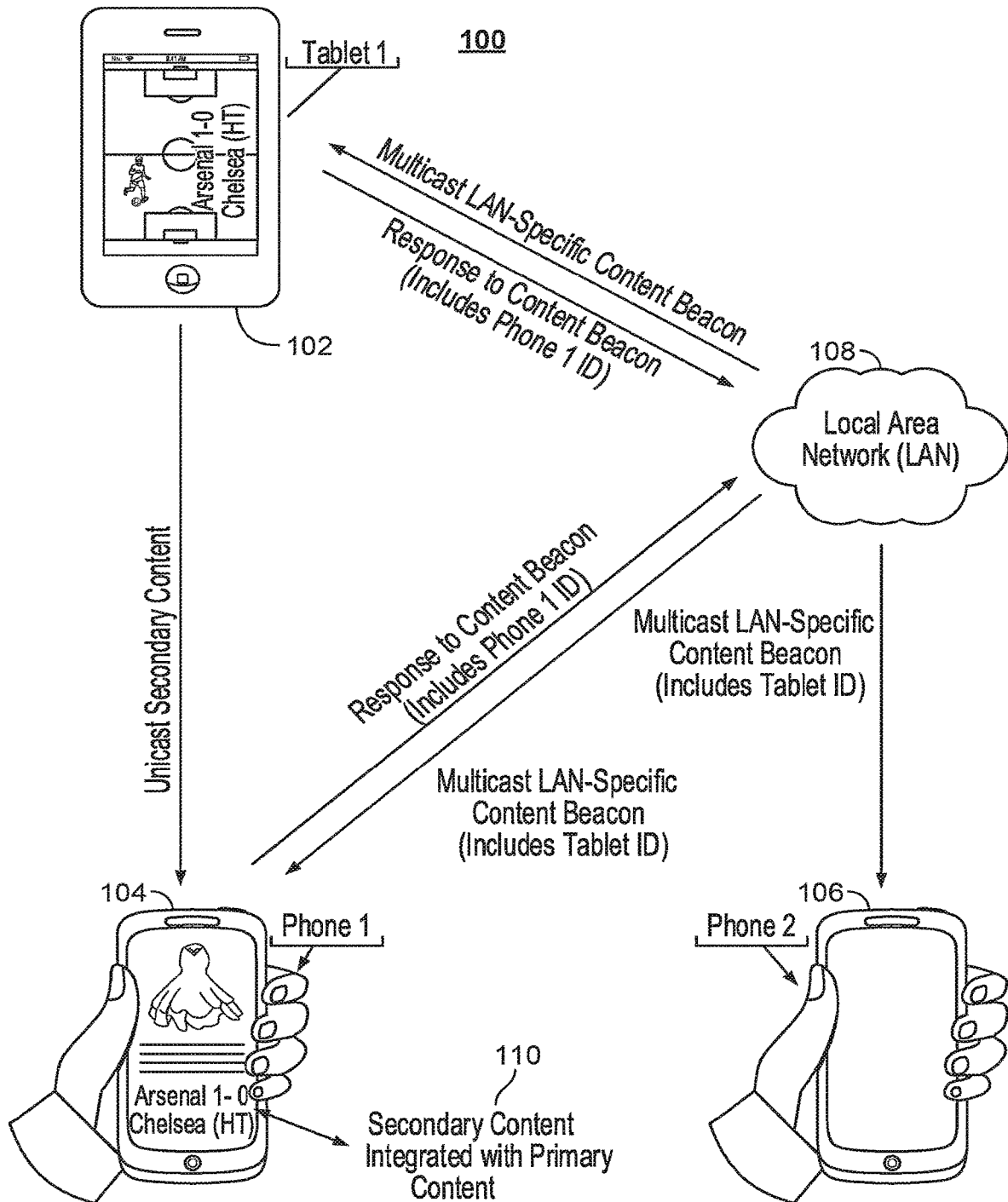
FIG. 1 shows an illustrative depiction of a system for distribution of secondary content between user equipment devices over a local area network, in accordance with some embodiments of the disclosure.

FIG. 1 shows an illustrative depiction of a system 100 for distribution of secondary content between user equipment devices 102, 104, 106 over a LAN in accordance with an embodiment of the present disclosure. System 100 includes first user equipment device 102 (e.g., a tablet), second user equipment device 104 (e.g., a mobile phone associated with a first user) and third user equipment device 106 (e.g., a second mobile phone associated with a second user). Although FIG. 1 depicts first user equipment device 102 as a tablet, and second and third user equipment devices 104, 106 as mobile phones, it will be understood that any suitable device for displaying and distributing content may be used, such as user television equipment 302, user computer equipment 304, and/or wireless user communications device 306 discussed below in relation to FIG. 3. User equipment devices 102, 104, and 106 may have control circuitry (e.g., control circuitry 204 discussed later in more detail with reference to FIG. 2) configured to generate primary content and secondary content for display (e.g., on a display such as display 212 discussed later in more detail with reference to FIG. 2) at one or more of first, second, and third user equipment devices 102, 104, and 106.

Moreover, FIG. 1 depicts first user equipment device 102 as displaying a soccer match (e.g., a match between Arsenal and Chelsea football clubs) for illustrating the operation of the present disclosure. It will be understood that, consistent with the present disclosure, first user equipment device 102 needs only to be able to access information about the soccer match (e.g., score updates) and that generating the content for display at first user equipment device 102 is not required. Control circuitry 204 may access content information (e.g., information about the soccer match) from one or more of a variety of content sources such as over-the-air signals, cable network signals, and wired or wireless streaming sources discussed further in relation to content source 316 of FIG. 3.

Second user equipment device 104 is depicted displaying primary content (e.g., a movie such as "Wall-E"). Control circuitry 204 may receive the primary content from one or more of a variety of content sources such as over-the-air signals, cable network signals, and wired or wireless streaming sources discussed further in relation to content source 316 of FIG. 3. First, second, and third user equipment devices 102, 104, and 106 are connected over LAN 108 (e.g., a wired LAN connection such as an Ethernet connection and/or a Wireless LAN connection such as a Wi-Fi network within a home). For example, LAN 108 may be a switch (e.g., a router) that connects first, second, and third user equipment devices 102, 104, 106, and allows sharing of content over LAN 108.

When control circuitry of first user equipment device 102 receives a score update related to the soccer match, the control circuitry of first user equipment device 102 multicasts a LAN-specific content beacon over LAN 108 to all devices connected to LAN 108 (e.g., second and third user equipment devices 104 and 106). The multicast LAN-specific content beacon comprises an identifier uniquely identifying first user equipment device 102. For example, the multicast LAN-specific content beacon comprises a media access control address (MAC address) of first user equipment device 102, which uniquely identifies first user equipment device 102 to a network interface controller (NIC) of a device receiving the multicast LAN-specific content beacon (e.g., user equipment devices 104, 106).

When the multicast LAN-specific content beacon is received by the respective NICs of user equipment devices 104, 106 over LAN 108, the respective control circuitries of user equipment devices 104, 106 determine whether to respond to the multicast LAN-specific content beacon. FIG. 1 depicts an embodiment in which control circuitry of second user equipment device 104 sends a response to the multicast LAN-specific content beacon over LAN 108 while control circuitry of third user equipment device 106 does not send a response to the multicast LAN-specific content beacon. A person skilled in the art will understand that there may other embodiments where neither of the user equipment devices 104, 106 sends a response to the multicast LAN-specific content beacon or where both of the user equipment devices 104, 106 send a response to the multicast LAN-specific content beacon.

The response to the multicast LAN-specific content beacon includes identification information uniquely identifying second user equipment device 104. For example, control circuitry of second user equipment device 104 includes a MAC address of second user equipment device 104. In addition, the response to the multicast LAN-specific content beacon includes a request for secondary content. Specifically, control circuitry of second user equipment device 104 sends a request for secondary content to be integrated into the primary content (i.e., the movie "Wall-E") being generated for display.

When control circuitry of first user equipment device 102 receives the response to the multicast LAN-specific content beacon over LAN 108, the control circuitry of first user equipment device 102 identifies profile information corresponding to second user equipment device 104 based on the received MAC address. For example, control circuitry of first user equipment device 102 may cross-reference a lookup table (LUT) to retrieve profile information corresponding to second user equipment device 104. Control circuitry of first user equipment device 102 then generates secondary content based on the retrieved profile information corresponding to second user equipment device 104. For example, control circuitry of first user equipment device 102 may determine that second user equipment device 104 has previously processed data related to soccer matches in which Arsenal has played, and therefore, generate secondary content comprising of a score update related to the soccer match between Arsenal and Chelsea football clubs. Although the above description describes generating the secondary content based on the user profile only, a person possessing ordinary skill in the art will appreciate that the content beacon may also account for additional factors including devices that have previously interacted with the content beacon as well as previously generated secondary content in generating new targeted secondary content.

The specific systems and methods for generating the secondary content at first user equipment device 102 are discussed in more detail below with reference to FIGS. 4-6.

Finally, control circuitry of first user equipment device 102 unicasts the generated secondary content over LAN 108 to second user equipment device 104 for integration with the primary content being generated for display at second user equipment device 104. As illustrated in FIG. 1, for example, control circuitry of first user equipment device 102 unicasts a score update 110 related to the soccer match between Arsenal and Chelsea football clubs over LAN 108 to second user equipment device 104 to be integrated within the movie "Wall-E" in a non-obtrusive manner such that a user viewing the movie on second user equipment device 104 can view the score update without interruption of the movie-watching experience.

In this way, second user equipment device 104 receives secondary content to be integrated into primary content being generated for display even when second user equipment device 104 is not connected to a WAN. Moreover, because the systems and methods described herein use LAN-specific content beacons to exchange identification information, the user is presented only with content determined to be of interest to them and is not presented with generic content which may not be relevant. This improvement is particularly relevant when inserting advertisements as the secondary content to maximize the effectiveness of the advertisement.

In some embodiments, third user equipment device 106 may also send a response to the multicast LAN-specific content beacon. The response to the multicast LAN-specific content beacon includes identification information uniquely identifying third user equipment device 106. For example, control circuitry of third user equipment device 106 includes a MAC address of third user equipment device 106. In addition, the response to the multicast LAN-specific content beacon includes a request for secondary content. Specifically, control circuitry of third user equipment device 106 sends a request for secondary content (e.g., an advertisement) to be integrated into the primary content (e.g., a video game) being generated for display.

When control circuitry of first user equipment device 102 receives the response to the multicast LAN-specific content beacon over LAN 108, the control circuitry of first user equipment device 102 identifies profile information corresponding to third user equipment device 106 based on the received MAC address. For example, control circuitry of first user equipment device 102 may cross-reference the LUT to retrieve profile information corresponding to third user equipment device 106. Control circuitry of first user equipment device 102 then generates a second secondary content based on the retrieved profile information corresponding to third user equipment device 106. For example, control circuitry of first user equipment device 102 may determine that third user equipment device 106 has previously processed data related to movies belonging to the science fiction genre, and therefore, generate the second secondary content comprising of an advertisement for an upcoming science fiction movie.

Finally, control circuitry of first user equipment device 102 unicasts the generated second secondary content over LAN 108 to third user equipment device 106 for integration with the primary content being generated for display at third user equipment device 106. As illustrated in FIG. 1, for example, control circuitry of first user equipment device 102 unicasts an advertisement for an upcoming science fiction movie over LAN 108 to third user equipment device 106 to be integrated within the video game in a non-obtrusive manner such that a user playing the video game on third user equipment device 106 can view the advertisement without interruption of the gameplay experience.

Accordingly, control circuitry 204 of first user equipment device 102 transmits two separate unicasts comprising respective secondary content to second user equipment device 104 and third user equipment device 106. In an embodiment, second user equipment device 104 may also be targeted with the advertisement related to the upcoming science fiction movie event though second user equipment device 104 has previously not indicated any interest in such content based on data retrieved from other devices within the LAN such as third user equipment device 106.

In some embodiments, the multicast LAN-specific content beacon includes a catalog of content available to be shared over the LAN from first user equipment device 102. For example, the catalog of available content included within the multicast LAN-specific content beacon sent from first user equipment device 102 may include targeted advertisements, content from media assets stored on first user equipment device 102, content from media assets accessible via first user equipment device 102, user profile information, and the like. The response to the multicast LAN-specific content beacon from second user equipment device 104 and third user equipment device 106 may include a selection of one or more content items from the catalog included within the multicast LAN-specific content beacon.

The multicast LAN-specific content beacon may include two levels of security. The first level of security may be provided by the LAN and/or the WAN. For example, the multicast LAN-specific content beacon may only be transmitted over a secured Wi-Fi connection (e.g., Wi-Fi having enterprise security) and not over open Wi-Fi networks. In some embodiments, the second level of security may be provided via a subscription model that are managed by the multicast LAN-specific content beacon owners. For example, third party vendors (e.g., video game developers, movie content distributers, cable service providers, etc.) who wish to provide content to devices connected to a LAN may license their content to the owner of first user equipment device 102 from which the multicast LAN-specific content beacon is generated. Accordingly, the content from such third-party vendors may be added to the catalog of available content included within the multicast LAN-specific content beacon sent from first user equipment device 102 over LAN 108. Additionally, devices integrating secondary content to their primary content may use a subscription like mode managed by the content beacon owners. Specifically, devices generating the content beacons (i.e., content beacon owners) may authenticate other devices connected to the LAN and determine eligibility to receive unicast secondary content based on the respective identification information and subscriptions.

In one example of a distribution flow of secondary content between user equipment devices over a local area network, a first device (e.g., first user equipment device 102) accesses locally targeted content (e.g., content whose distribution is intended to be limited to LAN 108). The first device assembles a LAN-specific content beacon to be multicast over the LAN. As discussed above, the LAN-specific content beacon may include a catalog of available content that the first device may provide. A second device connected to the LAN (e.g., second user equipment device 104) running an application (e.g., a video game) may search for content to be inserted within the application. The second device may scan the LAN for any content beacons and find the LAN-specific content beacon multicast by the first device. The first device and the second device may exchange authentication information to confirm that the second device is authorized to access the content available from the first device. The second device selects a content from the catalog included within the LAN-specific content beacon and unicasts a request for the content. The first device, in response to receiving the unicast request for the content from the catalog, unicasts the content to the second device. The second device accordingly receives the desired content to be inserted within the application currently in operation.

Although the description above describes the first device as multicasting a content catalog over the LAN, the description is not so limited. In some embodiments, the first device may optionally, or additionally, assemble a LAN-specific content beacon as a schedule of content (e.g., like scheduled programming on a television broadcasting channel). Specifically, the first device may begin multicasting the available content over the LAN. The second device may scan the LAN for specific desired content and select the appropriate content using the beacon schedule to determine the exact time when content of interest gets broadcasted.

As referred to herein, the term "content" should be understood to mean an electronically consumable media asset, such as television programming, as well as pay-per-view programs, on-demand programs (such as video-on-demand (VOD) systems), Internet content (e.g., streaming content, downloadable content, Webcasts, etc.), video clips, audio clips, content information, pictures, rotating images, documents, playlists, websites, articles, books, electronic books, advertisements, blogs, chat sessions, social media applications, video games, and/or any other media or multimedia and/or combination of the same. As used herein, the term "multimedia" should be understood to mean content that uses at least two different content forms described above, for example, text, audio, video, images, or interactivity content forms. Content may be recorded, played, displayed, or accessed by the user equipment devices.

Figure 2:
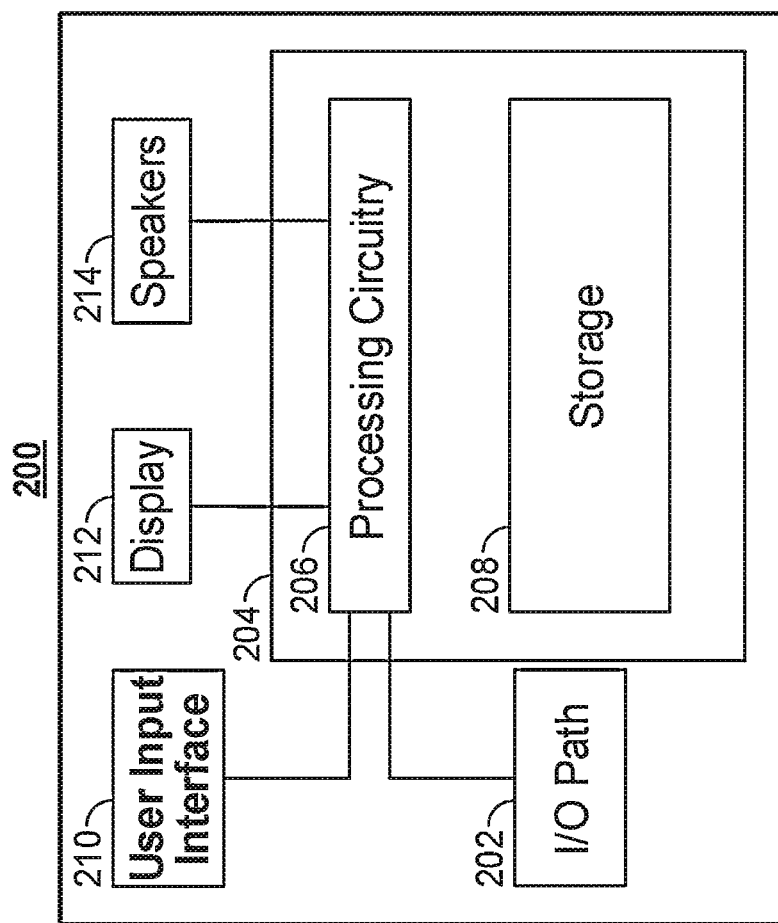
FIG. 2 is a block diagram of an illustrative media system, in accordance with some embodiments of the disclosure.

FIG. 2 depicts a generalized embodiment of an illustrative device (e.g., user equipment devices 102, 104, 106) that display and/or distributes primary content and secondary content over a LAN (e.g., LAN 108). User equipment device 200 may be any of a plurality of user devices such as a smartphone, a tablet, personal computer, set-top box, etc. (discussed further below with respect to FIG. 3). User equipment device 200 may receive primary content and data via input/output (hereinafter "I/O") path 202. I/O path 202 may provide primary content (e.g., on-demand programming, Internet content, content available over LAN or WAN, and/or other primary content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 204 executes instructions for an application stored in memory (e.g., memory 208). Specifically, control circuitry 204 may be instructed by a media application to perform the functions discussed above and below. For example, the media application may provide instructions to control circuitry 204 to multicast the LAN-specific content beacon and generate the secondary content based on profile information associated with a user device responding to the multicast LAN-specific content beacon. In some implementations, any action performed by control circuitry 204 may be based on instructions received from the media application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content into the preferred output format of user equipment device 200, and converter circuitry for converting between digital and analog signals. The tuning and encoding circuitry may be used by user equipment device 200 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user equipment device 200, the tuning and encoding circuitry may be associated with storage 208.

Storage 208 may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes such as caching application instructions, recording media assets, storing portions of a media asset, buffering segments of media, etc. As described herein, storage 208 may be used to store one or more LUTs storing a number of MAC addresses associated with a plurality of user equipment devices and their corresponding profile information.

A user may send instructions to control circuitry 204 using user input interface 210. User input interface 210 may be any suitable user input interface, such as a remote control, mouse, trackball, keypad, keyboard, touch screen, touchpad, stylus input, joystick, voice recognition interface, or other user input interfaces. Instructions to control circuitry 204 may be transmitted through I/O path 202, that could consist of a video tracking and detection mechanism, Internet of Things (IoT) and home automation triggers, emergency alert systems, and software or hardware communication pipelines and/or notification centers.

Display 212 may be provided as a stand-alone device or integrated with other elements of each one of user equipment device 200. For example, display 212 may be a touchscreen or touch-sensitive display, a projector, or a casting device. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry may be used to receive, display, and play content.

Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214. The speakers 214 may be part of, but not limited to, a home automation system.

The media application may be implemented using any suitable architecture. For example, it may be a stand-alone application wholly implemented on user equipment device 200. The user interface application and/or any instructions for performing any of the embodiments discussed herein may be encoded on computer-readable media. Computer-readable media includes any media capable of storing data. In some embodiments, the media application may be configured to generate the secondary content based on profile information corresponding to second user equipment device 104 (discussed further in relation to FIGS. 5 and 6).

Figure 3:
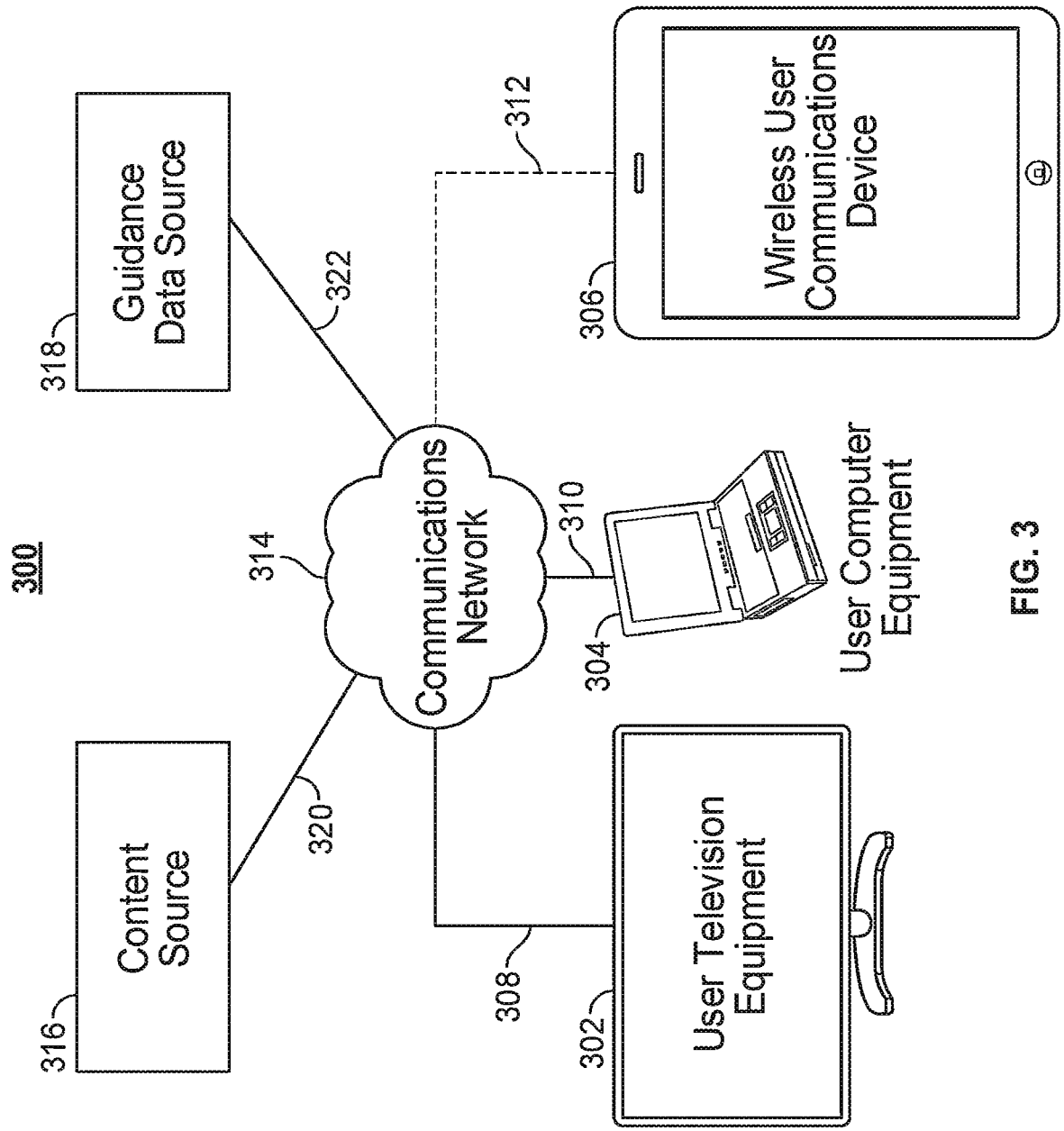
FIG. 3 is a block diagram of an illustrative user equipment device, in accordance with some embodiments of the disclosure.

FIG. 3 depicts an exemplary media system in accordance with some embodiments of the disclosure in which user equipment devices 102, 104, 106, and user equipment device 200 can be implemented in system 300 of FIG. 3 as user television equipment 302, user computer equipment 304, wireless user communications device 306, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 302 may include a set-top box, an integrated receiver decoder (IRD) for handling satellite television, a television set, a digital storage device, or other user television equipment. One or more of these devices may be integrated to be a single device, if desired. User computer equipment 304 may include a PC, a laptop, a streaming content aggregator, a PC media center, or other user computer equipment. It may include devices like digital assistance, smart speakers, and/or home automation. Wireless user communications device 306 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 314. Namely, user television equipment 302, user computer equipment 304, and wireless user communications device 306 are coupled to communications network 314 via communications paths 308, 310, and 312, respectively. Communications network 314 is used by the user equipment to obtain primary content. The secondary content to be shared between user equipment devices 102, 104, and 106 is distributed over a LAN such as LAN 108 as described above in connection with FIG. 1. Communications network 314 may be one or more networks including the Internet, a mobile phone network, ad-hoc network, cable network, or other types of communications network or combination of communications networks. Paths 308, 310, and 312 may separately or together include one or more communications paths, including any suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths). Communications with the user equipment may be provided by one or more of these communications paths but are shown as a single path in FIG. 3 to avoid overcomplicating the drawing. The user equipment devices may communicate with each other directly through an indirect path via communications network 314 or through a direct path using a device-to-device network (e.g., wired connection such as an Ethernet connection).

System 300 includes content source 316 and guidance data source 318 coupled to communications network 314 via communications paths 320 and 322, respectively. Paths 320 and 322 may include any of the communications paths described above in connection with paths 308, 310, and 312. Communications with the content source 316 and guidance data source 318 may be exchanged over one or more communications paths but are shown as a single path in FIG. 3 to avoid overcomplicating the drawing. In addition, there may be more than one of each of content source 316 and guidance data source 318, but only one of each is shown in FIG. 3 to avoid overcomplicating the drawing. In some embodiments, content source 316 and guidance data source 318 are integrated as one source device. Although communications between sources 316 and 318 with user equipment 302, 304, and 306 are shown as through communications network 314, in some embodiments, sources 316 and 318 may communicate directly with user equipment devices 302, 304, and 306 via communications paths (not shown) such as those described above in connection with paths 308, 310, and 312.

Content source 316 may include one or more types of media distribution equipment such as a media server, cable system headend, satellite distribution facility, intermediate distribution facilities and/or servers, Internet providers, on-demand media servers, and other media providers. Content source 316 may be the originator of media content or may not be the originator of media content. Content source 316 may also include a remote media server used to store different types of media content (including a media asset selected by a user), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

Guidance data source 318 may provide media guidance data, such as the content information discussed above in relation to FIG. 1 or any other data related to a media asset or profile of a user. Guidance data may be provided to the user equipment using any suitable approach such as via a data feed or by querying a database of guidance data source 318. For example, control circuitry 204 may transmit a query to a database of guidance data source 318 comprising a command to retrieve metadata and an identifier uniquely representing a media asset. In response to transmitting the query, control circuitry 204 may receive a response from the database comprising metadata for the media asset uniquely represented by the identifier.

System 300 is intended to illustrate a number of approaches, or network configurations, by which user equipment devices and sources of media content and guidance data may communicate with each other for the purpose of accessing media and data related to the media. The configuration of the devices and paths in system 300 may change without departing from the scope of the present disclosure.

Figure 4:
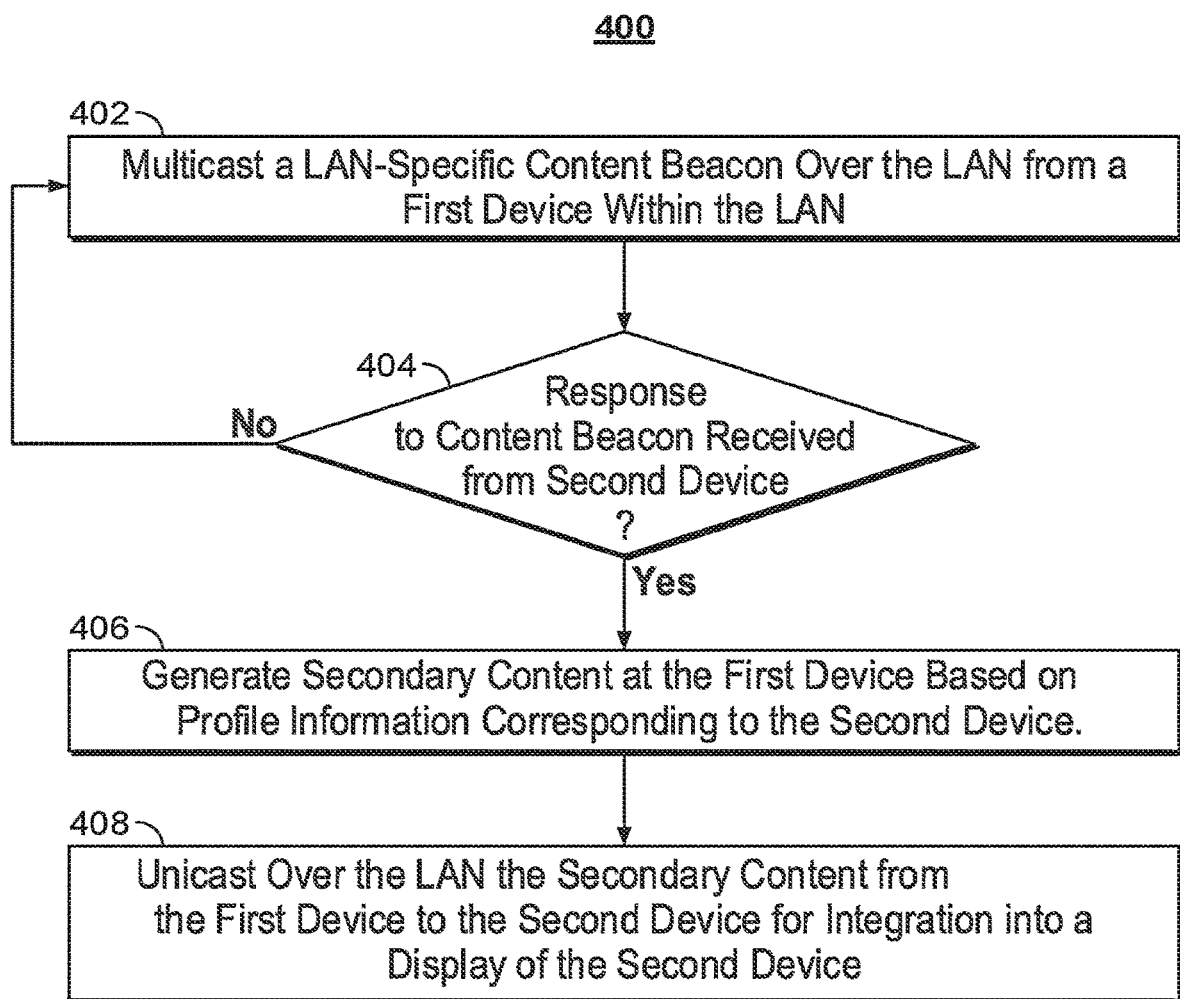
FIG. 4 is a flowchart of an illustrative process for distribution of secondary content between first and second user equipment devices over a local area network, in accordance with some embodiments of the disclosure.

FIG. 4 is a flowchart of an illustrative process 400 for distribution of secondary content between first and second user equipment devices over a local area network, in accordance with some embodiments of the disclosure. Process 400 begins at 402, where control circuitry 204 of first user equipment device 102 multicasts a LAN-specific content beacon over LAN 108. As discussed above, the multicast LAN-specific content beacon includes an identifier uniquely identifying first user equipment device 102. For example, the multicast LAN-specific content beacon comprises a media access control address (MAC address) of first user equipment device 102, which uniquely identifies first user equipment device 102 to a network interface controller (NIC) of a device receiving the multicast LAN-specific content beacon (e.g., user equipment devices 104, 106) over LAN 108.

At 404, control circuitry 204 determines whether a response to the multicast LAN-specific content beacon over LAN 108 has been received. Specifically, control circuitry 204 of first user equipment device 102 periodically multicasts the LAN-specific content beacon over LAN 108 until a response is received from one of more other user equipment devices connected within LAN 108. If no response to the multicast LAN-specific content beacon is received, control circuitry 204 of first user equipment device 102 periodically multicasts the LAN-specific content beacon over LAN 108.

Once a response to the multicast LAN-specific content beacon over LAN 108 is received, the process proceeds to 406. As discussed above, the response to the multicast LAN-specific content beacon over LAN 108 includes identification information uniquely identifying the user equipment device responding to the multicast LAN-specific content beacon. For example, control circuitry 204 of second user equipment device 104 includes a MAC address of user equipment device 104 and a request for secondary content in the response to the multicast LAN-specific content beacon.

At 406, secondary content is generated by control circuitry 204 of first user equipment device 102 based on profile information corresponding to second user equipment device 104. For example, control circuitry 204 of first user equipment device 102 may cross-reference a LUT stored within storage 208 to retrieve profile information corresponding to second user equipment device 104. At 408, control circuitry 204 of first user equipment device 102 unicasts the generated secondary content to second user equipment device 104 for integration with primary content being generated for display at display 212 of second user equipment device 104. For example, control circuitry 204 of first user equipment device 102 generates secondary content comprising a score update related to the soccer match between Arsenal and Chelsea football clubs at 406 and unicasts the secondary content comprising a score update related to the soccer match to second user equipment device 104 for integration with the movie "Wall-E" being generated for display at display 212 of second user equipment device 104.

Figure 5:
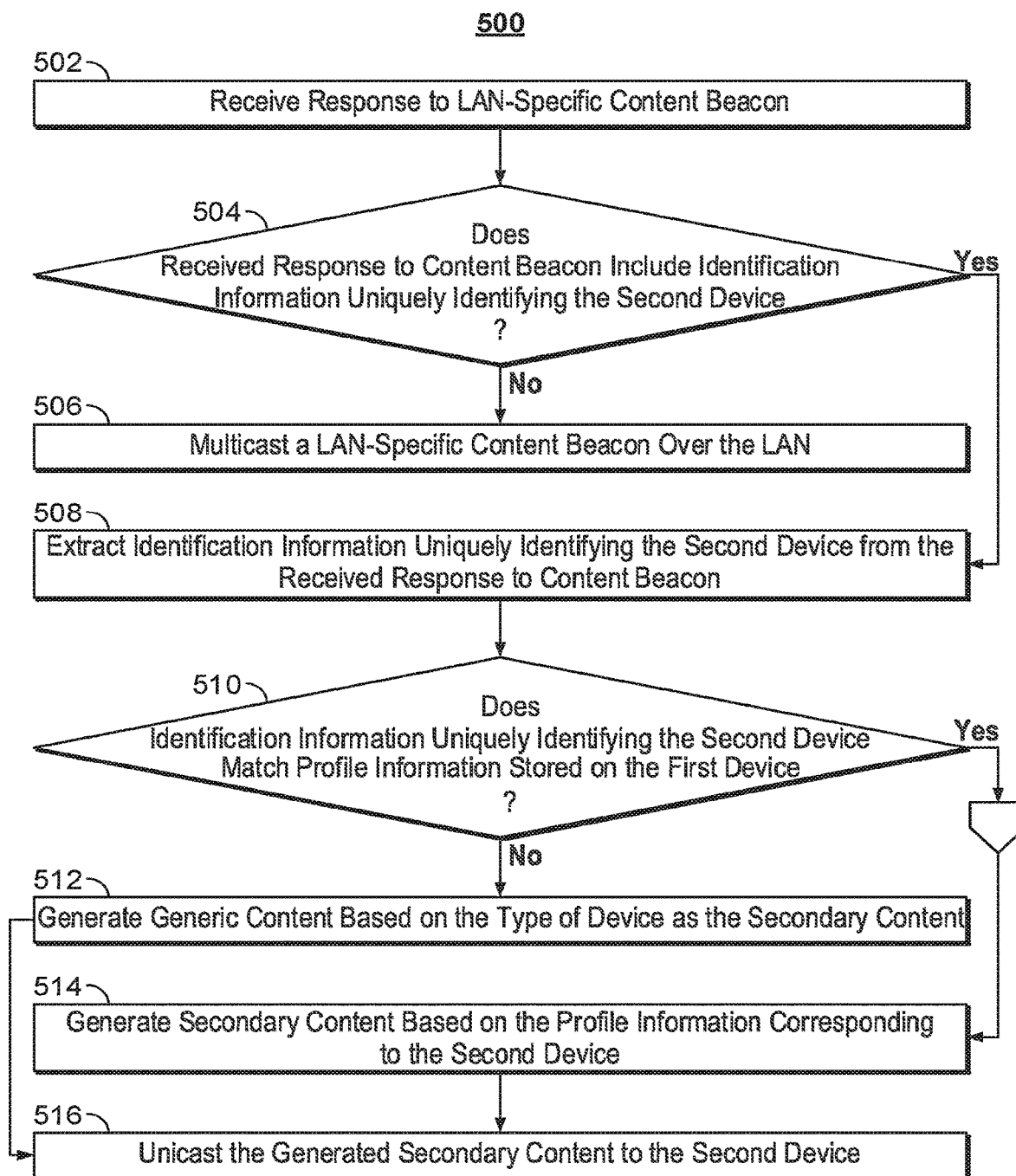
FIG. 5 is a flowchart of an illustrative process for generating the secondary content based on profile information corresponding to the second equipment device, in accordance with some embodiments of the disclosure.

FIG. 5 is a flowchart of an illustrative process 500 for generating the secondary content based on profile information corresponding to the second equipment device, in accordance with some embodiments of the disclosure. At 502, control circuitry 204 of first user equipment device 102 receives a response to the LAN-specific content beacon. At 504, control circuitry 204 of first user equipment device 102 checks whether the received response to the content beacon includes identification information uniquely identifying the device responding to the content beacon (e.g., second user equipment device 104). If, at 504, control circuitry 204 of first user equipment device 102 determines that the received response to the content beacon does not include identification information uniquely identifying the device responding to the content beacon (e.g., second user equipment device 104), the process proceeds to 506. At 506, control circuitry 204 of first user equipment device 102 drops the received response to content beacon as non-responsive and continues to periodically multicast the LAN-specific content beacon.

If, at 504, control circuitry 204 of first user equipment device 102 determines that the received response to the content beacon includes identification information uniquely identifying the device responding to the content beacon (e.g., second user equipment device 104), the process proceeds to 508. At 508, control circuitry 204 of first user equipment device 102 extracts identification information uniquely identifying the device responding to the content beacon from the received response. For example, control circuitry 204 of first user equipment device 102 extracts a MAC address included within the response to the content beacon.

At 510, control circuitry 204 of first user equipment device 102 attempts to match the extracted identification information from the response to the content beacon with profile information stored on first user equipment device 102. For example, control circuitry 204 of first user equipment device 102 accesses a plurality of LUTs stored on its storage 208 to determine whether identification information uniquely identifying second user equipment device 104 matches profile information stored on first user equipment device 102.

If control circuitry 204 of first user equipment device 102 is unable to identify profile information matching the identification information uniquely identifying second user equipment device 104, the process proceeds to 512. Specifically, at 512, control circuitry 204 of first user equipment device 102 generates secondary content based only on the limited information included within the response to the content beacon (e.g., type of device, etc.). If, on the other hand, control circuitry 204 of first user equipment device 102 identifies profile information matching the identification information uniquely identifying second user equipment device 104, the process proceeds to 514 and secondary content is generated based on the profile information in accordance with FIG. 6 described below.

At 516, control circuitry 204 of first user equipment device 102 unicasts the generated secondary content to second user equipment device 104. For example, control circuitry 204 of first user equipment device 102 unicasts content information retrieved via guidance data source 318 that is of interest to a user associated with second user equipment device 104 to second user equipment device 104 for integration with primary content being generated for display at display 212 of second user equipment device 104.

Figure 6:
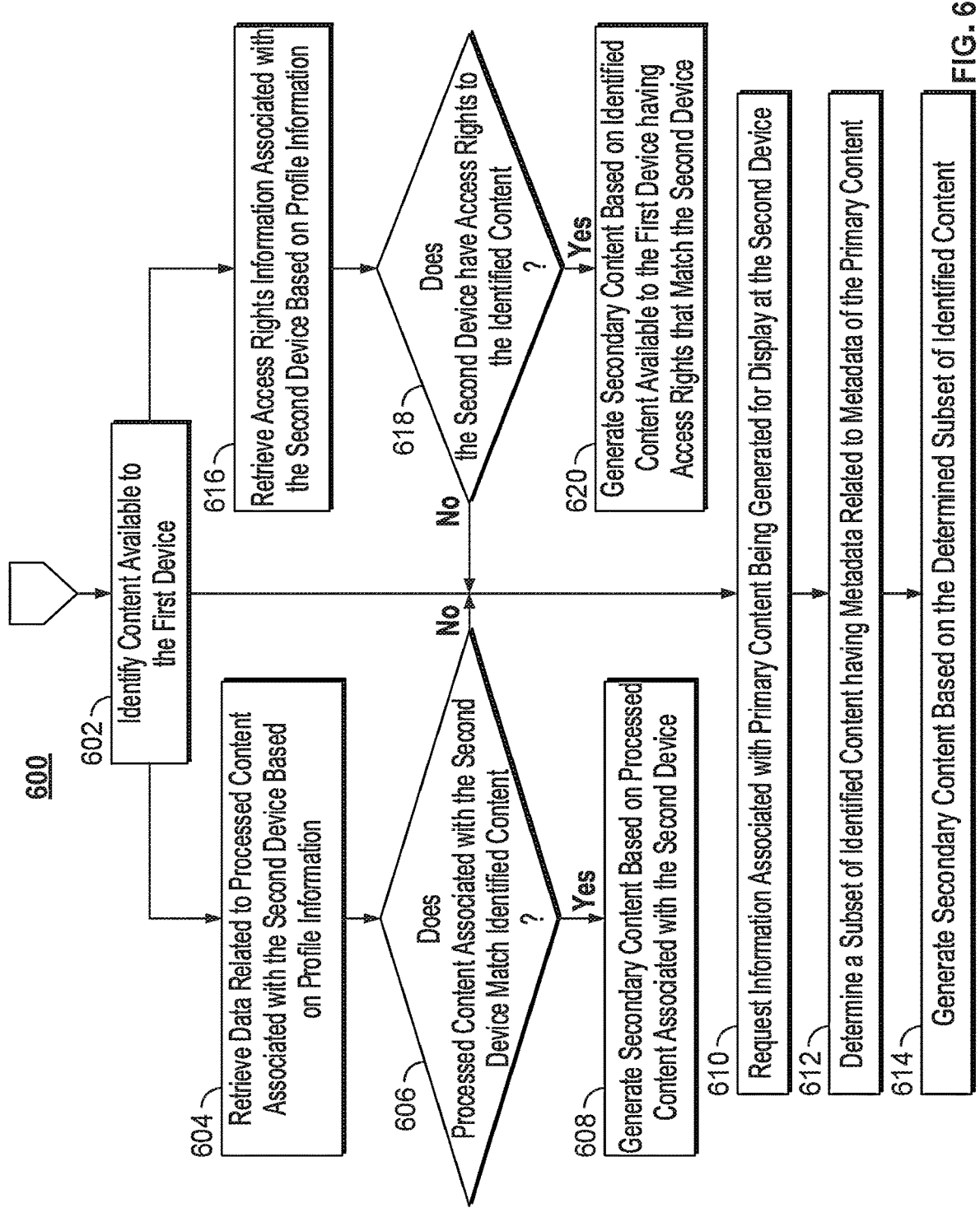
FIG. 6 is a flowchart of an illustrative process for generating the secondary content based on profile information corresponding to the second user equipment device and content available to the first user equipment device, in accordance with some embodiments of the disclosure.

FIG. 6 is a flowchart of an illustrative process 600 for generating the secondary content based on profile information corresponding to the second user equipment device and content available to the first user equipment device, in accordance with some embodiments of the disclosure. At 602, control circuitry 204 of first user equipment device 102 identifies content available to first user equipment device 102. For example, control circuitry 204 of first user equipment device 102 determines content to which first user equipment device 102 has access rights or content that is available via content source 316 and guidance data source 318.

At 604, control circuitry 204 of first user equipment device 102 retrieves data related to processed content associated with the second device based on profile information identified as corresponding to second user equipment device 104. For example, control circuitry 204 of first user equipment device 102 accesses a content-viewing history associated with second user equipment device 104. As used herein, "processed" means manifested either by displaying the content on a display such as display 212, outputting content to speakers and/or headphones such as speakers 214, or any other means of processing content for consumption as understood by a person possessing ordinary skill in the art.

At 606, control circuitry 204 of first user equipment device 102 determines whether processed content associated with second user equipment device 104 matches content identified to be available to first user equipment device 102. If, at 606, control circuitry 204 of first user equipment device 102 determines that processed content associated with second user equipment device 104 matches content identified to be available to first user equipment device 102, the process proceeds to 608, where control circuitry 204 of first user equipment device 102 generates secondary content based on processed content associated with second user equipment device 104 matching the content identified to be available to first user equipment device 102. For example, when control circuitry 204 of first user equipment device 102 determines that soccer matches in which Arsenal plays have been consumed via second user equipment device 104 and that a score update related to a soccer match between Arsenal and Chelsea football clubs is available, control circuitry 204 of first user equipment device 102 generates the secondary content based on the soccer match.

Alternatively, or additionally, process 600 also includes generating secondary content based on the primary content being generated for display at second user equipment device 104. At 610, control circuitry 204 of first user equipment device 102 retrieves information from second user equipment device 104 about the primary content being generated for display at second user equipment device 104. For example, control circuitry 204 of first user equipment device 102 may send a request to second user equipment device 104 for information about the primary content being generated for display at second user equipment device 104.

At 612, control circuitry 204 of first user equipment device 102 determines a subset of the content identified to be available to first user equipment device 102 that relates to metadata associated with the primary content being generated for display at second user equipment device 104. For example, control circuitry 204 of first user equipment device 102, based on receiving information that the primary content being generated for display at second user equipment device 104 is the movie "Wall-E," may determine that the user viewing the movie "Wall-E" is likely to be interested in upcoming release of animated movies. Accordingly, control circuitry 204 of first user equipment device 102 may determine a subset of the content identified to be available to first user equipment device 102 that relates to upcoming animated movies.

At 614, control circuitry 204 of first user equipment device 102 generates the secondary content based on the determined subset of content identified to be available to first user equipment device 102. For example, control circuitry 204 of first user equipment device 102 generates the secondary content comprising an advertisement for the movie, "Incredibles II" to be unicast to second user equipment device 104.

Alternatively, or additionally, process 600 also includes generating secondary content based on access rights associated with second user equipment device 104. Specifically, at 616, control circuitry 204 of first user equipment device 102 retrieves, from the profile information corresponding to second user equipment device 104, a list of content to which second user equipment device 104 has access rights. For example, control circuitry 204 of first user equipment device 102 may determine that second user equipment device 104 is associated with a minor and therefore has restricted access to content. At 618, control circuitry 204 of first user equipment device 102 determines a subset of content identified to be available to first user equipment device 102 that matches the access rights associated with second user equipment device 104. At 620, control circuitry 204 of first user equipment device 102 generates the secondary content based on the determined subset of content identified that matches the access rights associated with second user equipment device 104.

As noted above, subroutines 604 (comprising steps 604, 606, and 608), 610 (comprising steps 610, 612, and 614), and 616 (comprising steps 616, 618, and 620) of process 600 for generating the secondary content may be performed in combination with any other subroutines of the process 600 or performed by themselves.

Figure 7:
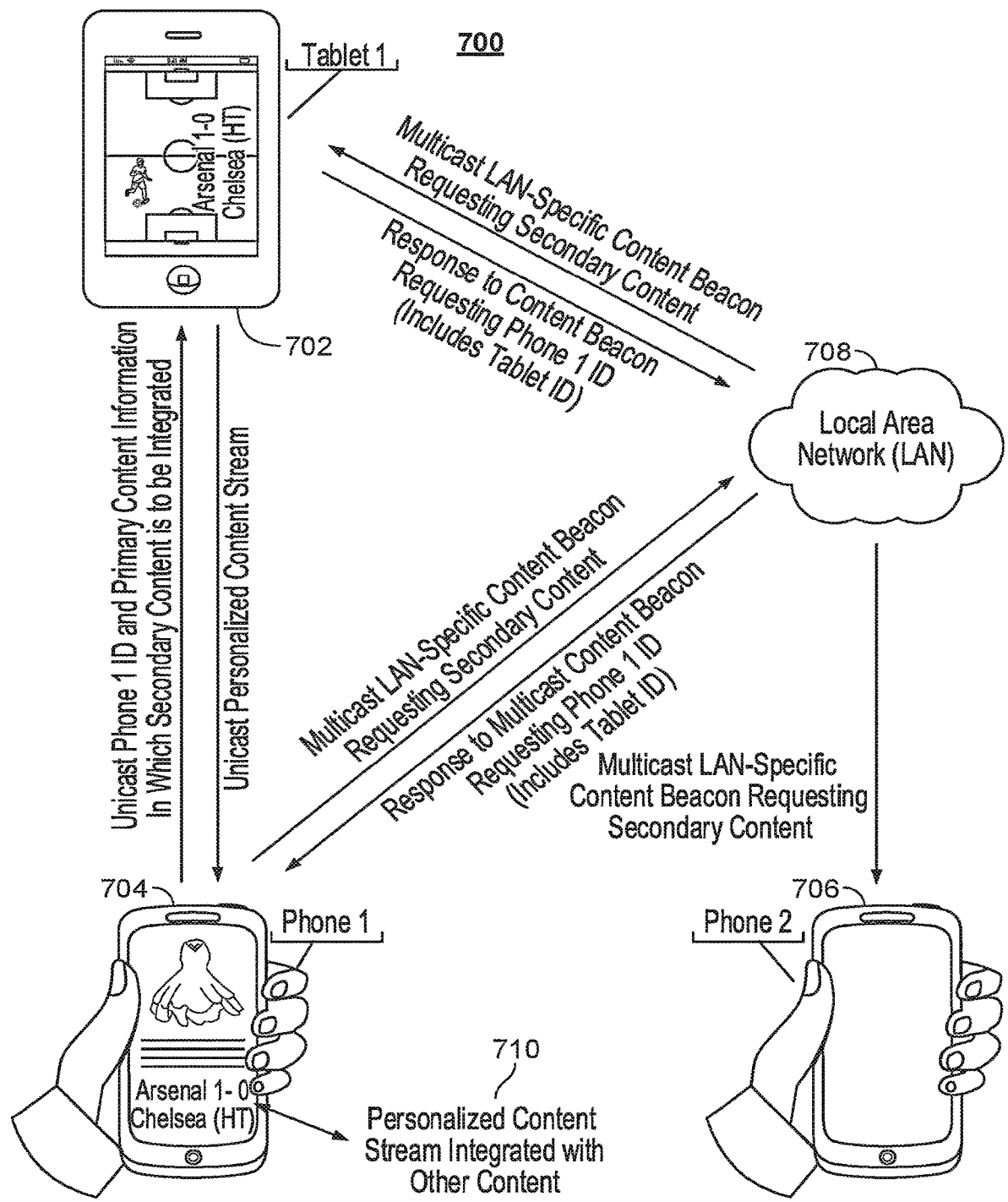
FIG. 7 shows an illustrative depiction of a system for distribution of secondary content between user equipment devices over a local area network, in accordance with some embodiments of the disclosure.

FIG. 7 shows an illustrative depiction of a system 700 for distribution of secondary content between user equipment devices 702, 704, 706 over a LAN in accordance with an embodiment of the present disclosure. System 700 includes first user equipment device 702 (e.g., a tablet), second user equipment device 704 (e.g., a mobile phone associated with a first user) and third user equipment device 706 (e.g., a second mobile phone associated with a second user). Although FIG. 7 depicts first user equipment device 702 as a tablet, and second and third user equipment devices 704, 706 as mobile phones, it will be understood that any suitable device for displaying and distributing content may be used, such as user television equipment 302, user computer equipment 304, and/or wireless user communications device 306 discussed above in relation to FIG. 3. User equipment devices 702, 704, and 706 may have control circuitry (e.g., control circuitry 204 discussed above) configured to generate primary content and secondary content for display (e.g., on a display such as display 212 discussed above) at one or more of first, second, and third user equipment devices 702, 704, and 706.

While FIG. 1 describes a "content broadcast" system where first user equipment device 102 initiates the broadcast the availability of a content beacon, FIG. 7 illustrates an embodiment of a "content request" system in which the request for the content beacon is initiated by the target device (e.g., second user equipment device 104) that desires the secondary content to display in conjunction with the primary content. As discussed above in connection with FIG. 1, the depiction of first user equipment device 702 as displaying a soccer match is for illustrative purposes only. It will be understood that, consistent with the present disclosure, first user equipment device 702 needs only to be able to access information about the soccer match (e.g., score updates) and that generating the content for display at first user equipment device 702 is not required. Control circuitry 204 may access content information (e.g., information about the soccer match) from one or more of a variety of content sources such as over-the-air signals, cable network signals, and wired or wireless streaming sources as discussed above in relation to content source 316 of FIG. 3. In some embodiments, control circuitry 204 may receive content information from guidance data source 318 as described in more detail below in connection with FIG. 3.

Second user equipment device 704 is depicted displaying primary content (e.g., a movie such as "Wall-E"). Control circuitry 204 may receive the primary content from one or more of a variety of content sources such as over-the-air signals, cable network signals, and wired or wireless streaming sources discussed above in relation to content source 316 of FIG. 3. First, second, and third user equipment devices 702, 704, and 706 are connected over LAN 708 (e.g., a wired LAN connection such as an Ethernet connection and/or a Wireless LAN connection such as a Wi-Fi network within a home). For example, LAN 708 may be a switch (e.g., a router) that connects first, second, and third equipment devices 702, 704, 706, and allows sharing of content over LAN 708.

Control circuitry of user equipment device 704, when generating the primary content for display at second user equipment device 704, may determine to incorporate secondary content that would be of interest to a user associated with user equipment device 704. For example, when a user is in the middle of watching a movie (e.g., "Wall-E"), the control circuitry of second user equipment device 704 may determine that the user may be interested in a score update related to a soccer match between Arsenal and Chelsea football clubs. In another example embodiment, the control circuitry of second user equipment device 704 may determine to insert an advertisement targeted to the user associated with second user equipment device 704 when generating the movie for display. As illustrated in FIG. 7, the control circuitry of second user equipment device 704 multicasts a LAN-specific content beacon over LAN 708 to all devices connected to the LAN 708 (e.g., first and third user equipment devices 702 and 706) requesting secondary content to be integrated with the primary content being generated for display at second user equipment device 704.

FIG. 7 depicts an embodiment in which control circuitry of first user equipment device 702 sends a response to the multicast LAN-specific content beacon over LAN 708 while control circuitry of third user equipment device 706 does not send a response to the multicast LAN-specific content beacon. A person skilled in the art will understand that there may be other embodiments where neither of first and third user equipment devices 702, 706 sends a response to the multicast LAN-specific content beacon or where both of first and third user equipment devices 702, 706 send a response to the multicast LAN-specific content beacon.

As shown in FIG. 7, the control circuitry of first user equipment device 702 sends a response to the multicast LAN-specific content beacon over LAN 708. The response to the multicast LAN-specific content beacon comprises an identifier uniquely identifying first user equipment device 702. For example, the response to the multicast LAN-specific content beacon comprises a media access control address (MAC address) of first user equipment device 702, which uniquely identifies first user equipment device 702 to a network interface controller (NIC) of second user equipment device 704. In addition, the response to the multicast LAN-specific content beacon includes a request for identification information uniquely identifying second user equipment device 704.

When second user equipment device 704 receives the response to the multicast LAN-specific content beacon including the request for identification information, control circuitry 204 of second user equipment device 704 unicasts to first user equipment device 702 (based on identification information of first user equipment device 702 included with the response to the multicast LAN-specific content beacon) the requested identification information uniquely identifying second user equipment device 704. Optionally, the control circuitry of second user equipment device 704 also unicasts information related to primary content being generated for display at second user equipment device 704 to first user equipment device 702. For example, control circuitry of second user equipment device 704 unicasts a MAC address of second user equipment device 704 and information related to the primary content (i.e., the movie "Wall-E") being generated for display at second user equipment device 704.

In response to receiving the unicast from second user equipment device 704, the control circuitry of first user equipment device 702 identifies profile information corresponding to second user equipment device 704 based on the received MAC address. For example, control circuitry of first user equipment device 702 may cross-reference a LUT to retrieve profile information corresponding to second user equipment device 704. Alternatively, if first user equipment device 702 determines that there is no profile information corresponding to second user equipment device 704, first user equipment device 702 may multicast a request over LAN 708 for the content desired by second user equipment device 704. For instance, the third user equipment device 706 may respond to the multicast LAN-specific content beacon requesting profile information corresponding to second user equipment device 704. Specifically, the third user equipment device 706 may unicast profile information corresponding to second user equipment device 704 to first user equipment device 702.

Control circuitry of first user equipment device 702 then generates secondary content based on the retrieved profile information corresponding to second user equipment device 704. For example, control circuitry of first user equipment device 702 may determine that second user equipment device 704 has previously processed data related to soccer matches in which Arsenal has played, and therefore, generate secondary content comprising of a score update related to the soccer match between Arsenal and Chelsea football clubs. The specific systems and methods for generating the secondary content at first user equipment device 702 were discussed in more detail above with reference to FIGS. 5 and 6.

Finally, control circuitry of first user equipment device 702 unicasts the generated secondary content over LAN 708 to second user equipment device 704 for integration with the primary content being generated for display at second user equipment device 704. As illustrated in FIG. 7, for example, control circuitry of first user equipment device 702 unicasts a score update 710 related to the soccer match between Arsenal and Chelsea football clubs over LAN 708 to second user equipment device 704 to be integrated within the movie "Wall-E" in a non-obtrusive manner such that a user viewing the movie on second user equipment device 704 can view the score update without interruption of the movie-watching experience.

Figure 8:
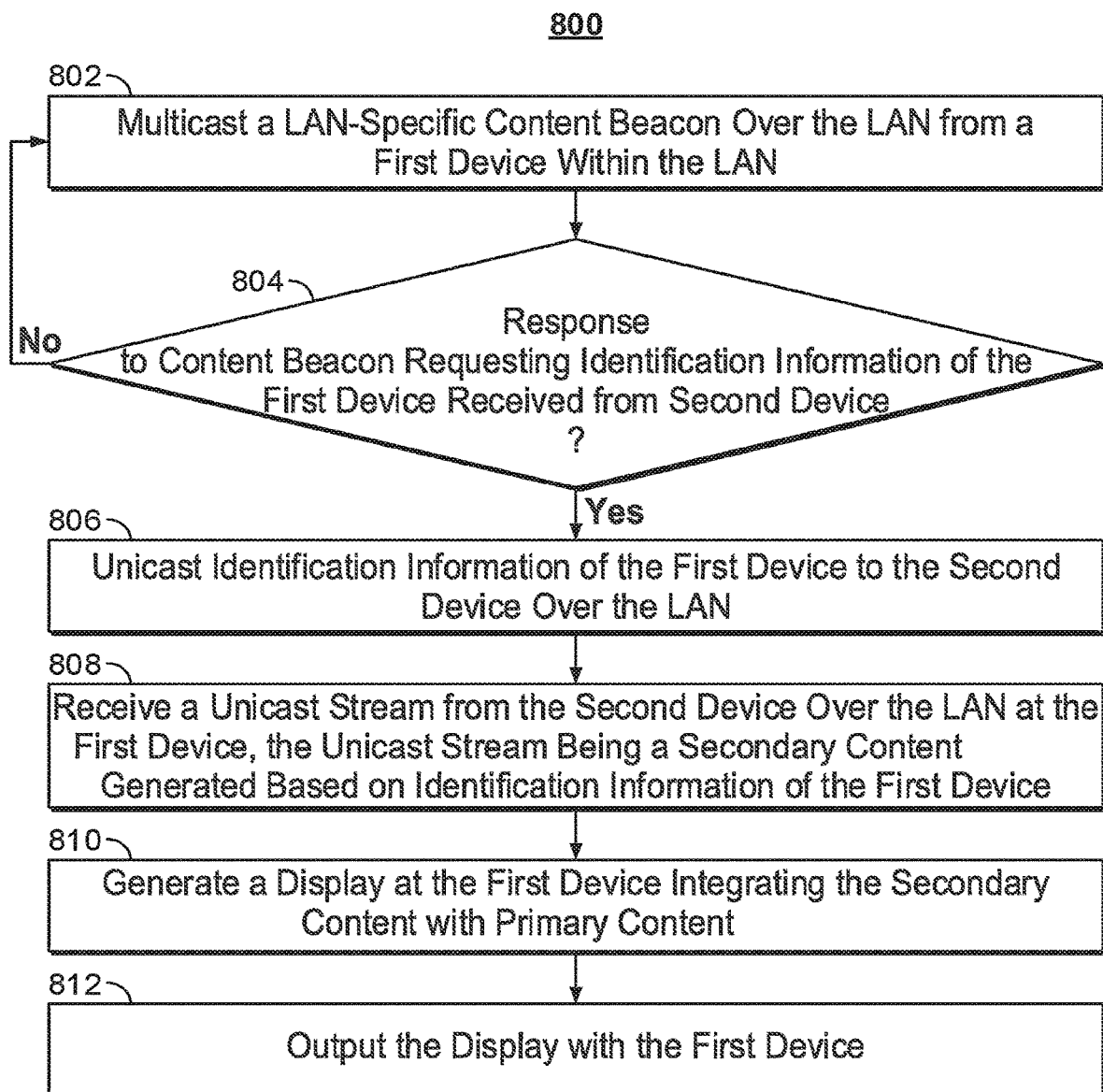
FIG. 8 is a flowchart of an illustrative process for distribution of secondary content between user equipment devices over a local area network, in accordance with some embodiments of the disclosure.

FIG. 8 is a flowchart of an illustrative process 800 for distribution of secondary content between user equipment devices over a LAN, in accordance with some embodiments of the disclosure. Process 800 begins at 802, where control circuitry 204 of a first device (e.g., second user equipment device 704) multicasts a LAN-specific content beacon over a LAN (e.g., LAN 708). As discussed above, the multicast LAN-specific content beacon includes a request for secondary content to be integrated with the primary content being generated for display at the first device.

At 804, control circuitry 204 determines whether a response to the multicast LAN-specific content beacon over the LAN requesting identification information of the first device has been received. For instance, control circuitry 204 of second user equipment device 704 periodically multicasts the LAN-specific content beacon over LAN 708 until a response is received from one of more other user equipment devices connected within LAN 708. Once a response to the multicast LAN-specific content beacon over LAN 708 is received, the process proceeds to 806. As discussed above, the response to the multicast LAN-specific content beacon includes an identifier uniquely identifying first user equipment device 702 (e.g., a MAC address) and a request for identification information uniquely identifying second user equipment device 704.

At 806, identification information of the first device is unicast to the second device. For example, control circuitry 204 of second user equipment device 704 (i.e., first device) unicasts identification information uniquely identifying second user equipment device 704 (e.g., a MAC address) to first user equipment device 702 (i.e., second device). At 808, the first device (e.g., control circuitry 204 of second user equipment device 704) receives a unicast stream from the second device (e.g., first user equipment device 702) where the unicast stream comprises secondary content generated based on profile information associated with the first device. For example, control circuitry 204 of second user equipment device 704 receives secondary content comprising a score update related to a soccer match between Arsenal and Chelsea football clubs based on profile information associated with second user equipment device 704 indicative of soccer matches featuring Arsenal being consumed on second user equipment device 704.

At step 810, the first device (e.g., control circuitry 204 of second user equipment device 704) generates a display combining the received secondary content with the primary content previously being generated for display at the first device. For example, control circuitry 204 of second user equipment device 704 generates a combined content which combines the received score update with the movie "Wall-E" previously being generated for display at second user equipment device 704. At step 812, the first device (e.g., control circuitry 204 of second user equipment device 704) outputs the combined content for display. For example, control circuitry 204 of second user equipment device 704 generates a combined content which integrates the score update on a billboard shown in the movie "Wall-E."

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 400, 500, 600, and 800 can be performed on any of the devices shown in FIGS. 1-3. Additionally, any of the steps in processes 400, 500, 600, and 800 can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method for displaying secondary content over a local area network (LAN), the method comprising:
    multicasting a LAN-specific content beacon over the LAN from a first device within the LAN, wherein the LAN-specific content beacon comprises a request for secondary content;
    receiving a response to the content beacon from a second device within the LAN requesting identification information of the first device;
    in response to receiving the response to the content beacon from the second device within the LAN, unicasting the identification information of the first device to the second device over the LAN, wherein the identification information comprises profile information associated with the first device that indicates content preferences;
    receiving a unicast stream from the second device over the LAN at the first device, the unicast stream being the secondary content selected based on the profile information associated with the first device;
    providing a display at the first device integrating the secondary content with primary content; and
    outputting the display with the first device.

2. The method of claim 1, wherein the response to the content beacon comprises an identifier uniquely identifying the second device.

3. The method of claim 1, wherein the response to the content beacon comprises information of content available to be shared over the LAN from the first device.

4. The method of claim 3, further comprising:
    in response to receiving the response to the content beacon, determining at least one content having metadata matching the metadata of the primary content; and
    selecting the secondary content based on the at least one determined content.

5. The method of claim 1, wherein the unicasting of the identification information of the first device to the second device over the LAN comprises:
    unicasting the identification information uniquely identifying the first device; and
    unicasting information related to the primary content being provided for display on the first device prior to receiving the secondary content.

6. The method of claim 1, wherein providing the display at the first device integrating the secondary content with the primary content comprises:
    providing a combined content stream comprising the secondary content and the primary content, wherein the secondary content is non-obtrusive to the primary content; and
    providing for display the combined content stream at the display of the first device.

7. The method of claim 1, further comprising:
    receiving a response to the content beacon from a third device within the LAN;
    in response to receiving the response to the content beacon from the third device within the LAN, unicasting the identification information of the first device to the third device over the LAN, wherein the response comprises the profile information associated with the first device that indicates content preferences;
    receiving a unicast stream from the third device over the LAN at the first device, the unicast stream being second secondary content selected based on the profile information associated with the first device;
    providing a display at the first device integrating the second secondary content with the primary content; and
    outputting the display with the first device.

8. The method of claim 1, wherein the LAN-specific content beacon includes information of content to which the first device has access rights to, and wherein the received secondary content is based on content to which the first device has access rights to.

9. The method of claim 1, wherein:
    the secondary content comprises a score corresponding to a sporting event; and
    the first device receives the response to the content beacon from the second device in response to the second device receiving a score update corresponding to the sporting event.

10. The method of claim 1, wherein the first device does not have access to the secondary content via a wide area network.

11. A system for displaying secondary content over a local area network (LAN), the system comprising:
    input/output circuitry configured to:
        multicast a LAN-specific content beacon over the LAN from a first device within the LAN, wherein the LAN-specific content beacon comprises a request for secondary content;
        receiving a response to the content beacon from a second device within the LAN requesting identification information of the first device; and
        in response to the input/output circuitry receiving the response to the content beacon from the second device within the LAN, unicast the identification information of the first device to the second device over the LAN, wherein the identification information comprises profile information associated with the first device that indicates content preferences;
        receiving a unicast stream from the second device over the LAN at the first device, the unicast stream being the secondary content wherein control circuitry is configured to select the secondary content based on the profile information associated with the first device; and
    wherein the control circuitry is further configured to:
        providing a display at the first device integrating the secondary content with primary content; and wherein the input/output circuitry is further configured to:
outputting the display with the first device.

12. The system of claim 11, wherein the response to the content beacon comprises an identifier uniquely identifying the second device.

13. The system of claim 11, wherein the response to the content beacon comprises information of content available to be shared over the LAN from the first device.

14. The system of claim 13, wherein the control circuitry is further configured to:
in response to receiving the response to the content beacon, determine at least one content having metadata matching the metadata of the primary content; and
select the secondary content based on the at least one determined content.

15. The system of claim 11, wherein the input/output circuitry is configured to unicast the identification information of the first device to the second device over the LAN by:
unicasting the identification information uniquely identifying the first device; and
unicasting information related to the primary content being provided for display on the first device prior to receiving the secondary content.

16. The system of claim 11, wherein the control circuitry is configured to provide the display at the first device integrating the secondary content with the primary content by:
providing a combined content stream comprising the secondary content and the primary content, wherein the secondary content is non-obtrusive to the primary content; and
providing for display the combined content stream at the display of the first device.

17. The system of claim 11, wherein:
the input/output circuitry is further configured to:
receive a response to the content beacon from a third device within the LAN;
in response to receiving the response to the content beacon from the third device within the LAN, unicast the identification information of the first device to the third device over the LAN, wherein the response comprises the profile information associated with the first device that indicates content preferences;
receive a unicast stream from the third device over the LAN at the first device, the unicast stream being second secondary content wherein the control circuitry is configured to select the secondary content based on the profile information associated with the first device; and
wherein the control circuitry is further configured to:
provide a display at the first device integrating the second secondary content with the primary content; and
wherein the input/output circuitry is further configured to:
output the display with the first device.

18. The system of claim 11, wherein the LAN-specific content beacon includes information of content to which the first device has access rights to, and wherein the received secondary content is based on content to which the first device has access rights to.

19. The system of claim 11, wherein:
the secondary content comprises a score corresponding to a sporting event; and
the first device receives the response to the content beacon from the second device in response to the second device receiving a score update corresponding to the sporting event.

20. The system of claim 11, wherein the first device does not have access to the secondary content via a wide area network.

* * * * *